US008826976B2

(12) United States Patent
Stehle et al.

(10) Patent No.: US 8,826,976 B2
(45) Date of Patent: Sep. 9, 2014

(54) MULTISTAGE PROCESS FOR PRODUCING MINERAL OIL USING MICROORGANISMS

(75) Inventors: Vladimir Stehle, Kassel (DE); Rajan Hollmann, Bad Essen (DE); Robert Thummer, Mannheim (DE)

(73) Assignee: Wintershall Holding GmbH, Kassel (DE)

( * ) Notice: Subject to any disclaimer, the term of this patent is extended or adjusted under 35 U.S.C. 154(b) by 274 days.

(21) Appl. No.: 13/367,565

(22) Filed: Feb. 7, 2012

(65) Prior Publication Data
US 2012/0199343 A1 Aug. 9, 2012

Related U.S. Application Data

(60) Provisional application No. 61/440,407, filed on Feb. 8, 2011.

(51) Int. Cl.
*E21B 43/22* (2006.01)
*C09K 8/582* (2006.01)
*E21B 43/16* (2006.01)
*E21B 43/20* (2006.01)

(52) U.S. Cl.
CPC ............... *E21B 43/20* (2013.01); *E21B 43/16* (2013.01); *C09K 8/582* (2013.01)
USPC .......................................... 166/246; 166/371

(58) Field of Classification Search
CPC combination set(s) only.
See application file for complete search history.

(56) References Cited

U.S. PATENT DOCUMENTS

| 2,660,550 A | 11/1953 | Updegraff et al. |
| 4,475,590 A | 10/1984 | Brown |
| 4,561,500 A * | 12/1985 | Thompson et al. ............ 166/246 |
| 4,844,168 A | 7/1989 | Sydansk |
| 4,889,563 A | 12/1989 | Parker et al. |
| 4,905,761 A | 3/1990 | Bryant |
| 5,046,561 A | 9/1991 | Huang et al. |
| 5,492,828 A | 2/1996 | Premuzic et al. |
| 6,758,270 B1 | 7/2004 | Sunde et al. |
| 6,838,417 B2 | 1/2005 | Bouwmeester et al. |
| 7,273,101 B2 | 9/2007 | Davies et al. |
| 2007/0092930 A1* | 4/2007 | Lal et al. .......................... 435/41 |
| 2008/0035344 A1 | 2/2008 | Odeh et al. |
| 2011/0088899 A1 | 4/2011 | Stehle et al. |
| 2012/0255729 A1 | 10/2012 | Stehle et al. |

FOREIGN PATENT DOCUMENTS

| DE | 4127744 A1 * | 2/1993 |
| GB | 2432587 A | 5/2007 |
| RU | 2 060 371 C1 | 5/1996 |

(Continued)

OTHER PUBLICATIONS

Borling, et al., "Pushing Out the Oil with Conformance Control", Oilfield Review, (1994), pp. 44-58.

(Continued)

*Primary Examiner* — Zakiya W Bates
(74) *Attorney, Agent, or Firm* — Drinker Biddle & Reath LLP

(57) ABSTRACT

A process for producing mineral oil from mineral oil deposits by injecting aqueous flooding media into a mineral oil formation through injection boreholes and withdrawing the mineral oil through production boreholes, wherein the process comprises several cycles of process steps in which oil-mobilizing microorganisms and flooding water are injected alternately into the deposit. Processes in which highly permeable regions of the mineral oil formation are additionally blocked.

11 Claims, 2 Drawing Sheets

(56) References Cited

FOREIGN PATENT DOCUMENTS

| RU | 2 066 743 C1 | 9/1996 |
| RU | 2 194 849 C1 | 12/2002 |
| RU | 2 204 014 C1 | 5/2003 |
| RU | 2 339 803 C2 | 11/2008 |
| SU | 1 654 554 A1 | 6/1991 |
| WO | WO-2007/135617 A1 | 11/2007 |
| WO | WO 2012/107373 | 8/2012 |

OTHER PUBLICATIONS

Nazina, et al., "The Phylogenetic Diversity of Aerobic Organotrophic Bacteria from the Dagang High-Termperature Oil Field", Microbiology, vol. 74, No. 3, (2005), pp. 343-351 (translated).

Nazina, et al., "Microbiological and Production Characteristics of the High-Temperature Kongdian Petroleum Reservoir Revealed During Field Trial of Biotechnology for the Enhancement of Oil Recovery", Microbiology, vol. 76, No. 3 (2007), pp. 297-309.

Belyaev, et al., "Use of Microorganisms in the Biotechnology for the Enhancement of Oil Recovery", Microbiology, vol. 73, No. 5, (2004), pp. 590-598. (translated).

Nazina, et al., "Production of Oil-Releasing Compounds by Microorganisms from the Daqing Oil Field, China", Microbiology, vol. 72, No. 2, (2003), pp. 173-178. (translated).

Altunina, et al., "Improved Oil Recovery of High-Viscosity Oil Pools with Physicochemical Methods and Thermal-Steam Treatments", Oil & Gas Science and Technology, vol. 63, No. 1, (2008), pp. 37-48.

Wikipedia, "Microbial Enhanced Oil Recovery", 13 pages.

Kevin C. Taylor, *Water-soluble hydrophobically associating polymers for improved oil recovery: A literature review*, Journal of Petroleum Science and Engineering 19 91998) pp. 265-280.

International Search Report for PCT/EP2012/051912, mailing date May 7, 2012.

International Preliminary Report on Patentability for PCT/EP2012/051912, mailing date Aug. 13, 2013.

\* cited by examiner

MULTISTAGE PROCESS FOR PRODUCING MINERAL OIL USING MICROORGANISMS

CROSS-REFERENCE TO RELATED APPLICATION

This application claims the benefit of U.S. Provisional Application Ser. No. 61/440,407 filed Feb. 8, 2011, the entire contents of which are incorporated herein by reference in its entirety.

FIELD OF THE INVENTION

The present invention relates to a process for producing mineral oil from mineral oil deposits by injecting aqueous flooding media into a mineral oil formation through injection boreholes and withdrawing the mineral oil through production boreholes, said process comprising several cycles of process steps in which oil-mobilizing microorganisms and flooding water are injected alternately into the deposit. It further relates to a process in which highly permeable regions of the mineral oil formation are additionally blocked.

BACKGROUND

In natural mineral oil deposits, mineral oil occurs in cavities of porous reservoir rocks which are closed off from the surface of the earth by impervious covering layers. In addition to mineral oil, including proportions of natural gas, a deposit further comprises water with a higher or lower salt content. The cavities may be very fine cavities, capillaries, pores or the like, for example those having a diameter of only approx. 1 µm; the formation may additionally also have regions with pores of greater diameter and/or natural fractures.

After the borehole has been sunk into the oil-bearing strata, the oil at first flows to the production boreholes owing to the natural deposit pressure, and erupts from the surface of the earth. This phase of mineral oil production is referred to by the person skilled in the art as primary production. In the case of poor deposit conditions, for example a high oil viscosity, rapidly declining deposit pressure or high flow resistances in the oil-bearing strata, eruptive production rapidly ceases. With primary production, it is possible on average to extract only 2 to 10% of the oil originally present in the deposit. In the case of higher-viscosity mineral oils, eruptive production is generally completely impossible.

In order to enhance the yield, what are known as secondary production processes are therefore used.

The most commonly used process in secondary mineral oil production is water flooding. This involves injecting water through injection boreholes into the oil-bearing strata. This artificially increases the deposit pressure and forces the oil out of the injection boreholes to the production boreholes. By means of water flooding, it is possible to substantially increase the yield level under particular conditions.

It is known that the mineral oil yield can be enhanced by the use of suitable chemicals as assistants for oil production. With the aid of these measures, the mobility of the mineral oil in the formation should be increased, such that it can be forced out of the formation more easily in the course of water flooding. This phase of mineral oil production is frequently referred to as "Tertiary Oil Production" or "Enhanced Oil Recovery" (EOR). For example, the interfacial tension $\sigma$ between the mineral oil and the aqueous phase can be lowered for this purpose by the addition of suitable surfactants, thus increasing the mobility of the oil phase. This technique is also known as "surfactant flooding". An overview of techniques for tertiary oil production can be found, for example, in the *Journal of Petroleum Science and Engineering* 19(1998)265-280.

A further known technique for tertiary mineral oil production is to enhance the mineral oil yield by using microorganisms, especially bacteria. This technique is known as "Microbial Enhanced Oil Recovery" (MEOR). This involves either injecting suitable microorganisms, nutrients for the microorganisms and optionally oxygen into the mineral oil formation, or promoting the growth of microorganisms already present in the mineral oil formation by injecting nutrients and optionally oxygen.

There are various known mechanisms by which bacteria can increase the mobility of mineral oil, for example by the formation of surfactants, reduction in the viscosity of the mineral oil resulting from degradation of high molecular weight hydrocarbons, formation of $CO_2$, formation of organic acids which can attack the rock formation and hence create new flow paths, or resulting from the detachment of the mineral oil from the rock surface. Methods for MEOR and microorganisms suitable for this purpose are disclosed, for example, in U.S. Pat. Nos. 4,475,590, 4,905,761 or 6,758,270 B1.

RU 2 060 371 C1 discloses a process for producing mineral oil using microorganisms from a deposit with inhomogeneous permeability, which has at least one injection borehole and at least one production borehole. In the process described, the deposit pressure is periodically increased and lowered. In pressure increase phases, microorganisms present in the mineral oil formation are activated by injecting a nutrient solution into the mineral oil formation. Subsequently, the injection borehole is closed. The withdrawal of mineral oil or water mixtures through the production borehole reduces the pressure again.

RU 2 194 849 C1 discloses a process for extracting mineral oil using microorganisms from a deposit with inhomogeneous permeability, which has at least one injection borehole and at least one production borehole. In the process described, the deposit pressure is periodically increased and reduced. In pressure increase phases, microorganisms and nutrient solution are injected into the formation in each case through the injection and production boreholes; in pressure reduction phases, the injection borehole is closed and liquid is withdrawn from the formation through the production borehole. Preference is given to injecting mesophilic bacteria into the injection borehole, and thermophilic bacteria into the production borehole. A disadvantage of this process is the low efficiency since the production borehole does not constantly produce oil but is regularly shut down.

RU 2 204 014 C1 discloses a process for producing mineral oil, in which a nutrient solution and carbon-oxidizing bacteria are injected into a mineral oil formation, followed by a biotechnologically produced polyacrylamide together with a crosslinker.

However, other difficulties can also occur with water flooding. In the ideal case, a water front proceeding from the injection borehole should force the oil homogeneously over the entire mineral oil formation to the production borehole. In practice, a mineral oil formation, however, has regions with different levels of flow resistance. In addition to oil-saturated reservoir rocks which have fine porosity and a high flow resistance for water, there also exist regions with low flow resistance for water, for example natural or synthetic fractures or very permeable regions in the reservoir rock. Such permeable regions may also be regions from which oil has already been recovered. In the course of water flooding, the flooding water injected naturally flows principally through flow paths with low flow resistance from the injection borehole to the
} production borehole. The consequences of this are that the oil-saturated deposit regions with fine porosity and high flow resistance are not flooded, and that increasingly more water and less mineral oil is produced via the production borehole. In this context, the person skilled in the art refers to "watering out of production". The effects mentioned are particularly marked in the case of heavy or viscous mineral oils. The higher the mineral oil viscosity, the more probable is rapid watering out of production.

The prior art therefore discloses measures for closing such highly permeable zones between injection boreholes and production boreholes by means of suitable measures. As a result of these, highly permeable zones with low flow resistance are blocked and the flooding water is forced to flow again through the oil-saturated, low-permeability strata. Such measures are also known as "conformance control". An overview of measures for conformance control is given by Borling et al. "*Pushing out the oil with Conformance Control*" in Oilfield Review (1994), pages 44 ff.

For conformance control, it is possible to use comparatively low-viscosity formulations of particular chemical substances which can be injected easily into the formation, and the viscosity of which rises significantly only after injection into the formation under the conditions which exist in the formation. To enhance the viscosity, such formulations comprise suitable inorganic or organic, or polymeric, components. The rise in viscosity of the injected formulation can firstly occur with a simple time delay. However, there are also known formulations in which the rise in viscosity is triggered essentially by the temperature rise when the injected formulation is gradually heated to the deposit temperature in the deposit. Formulations whose viscosity rises only under formation conditions are known, for example, as "thermogels" or "delayed gelling systems".

SU 1 654 554 A1 discloses mixtures of aluminum chloride or aluminum nitrate, urea and water, which are injected into the mineral oil formation. At the elevated temperatures in the formation, the urea is hydrolyzed to carbon dioxide and ammonia. The release of the ammonia base significantly increases the pH of the water, and results in precipitation of a highly viscous aluminum hydroxide gel, which blocks the highly permeable zones.

U.S. Pat. No. 4,889,563 discloses the use of aqueous solutions of aluminum hydroxide chloride in combination with urea or hexamethylenetetramine (urotropin) for blocking of underground mineral oil formations. Here too, the hydrolysis of urea or hexamethylenetetramine in the formation leads to an increase in the pH and the precipitation of aluminum hydroxide.

U.S. Pat. No. 4,844,168 discloses a process for blocking sections of high-temperature mineral oil formations, in which polyacrylamide and a polyvalent metal ion, for example Fe(III), Al(III), Cr(III) or Zr (IV), are injected into a mineral oil formation with a reservoir temperature of at least 60° C. Under the conditions in the formation, some of the amide groups —$CONH_2$ are hydrolyzed to —COOH groups, and the metal ions crosslink the —COOH groups formed, such that a gel is formed with a certain time delay.

Further suitable mixtures for "Conformance Control" are disclosed, for example, by RU 2 066 743 C1, WO 2007/135617, U.S. Pat. Nos. 7,273,101 B2, 6,838,417 B2 or US 2008/0035344 A1.

Mineral oil formations frequently do not have a homogeneous temperature distribution, but rather have more or less significant temperature gradients. Such temperature gradients may be of natural origin, but they can especially be caused by measures for secondary and/or tertiary mineral oil production. In the case of water flooding, cold water is frequently injected into the formation for months or even years. This generally lowers the formation temperature to a greater or lesser degree in the region around the injection borehole. As a typical example, table 1 shows the temperature decline in the formation temperature for some deposits in northern Siberia after prolonged water flooding:

TABLE 1

Deposit temperatures of different Siberian deposits S1 to S6 after prolonged water flooding.

| Deposit | Formation temperature [° C.] | Formation temperature in the injection region [° C.] | Difference [° C.] |
| --- | --- | --- | --- |
| S1 | 90 | 45 | 45 |
| S2 | 72 | 39 | 33 |
| S3 | 78 | 37 | 41 |
| S4 | 78 | 32 | 46 |
| S5 | 101 | 56 | 45 |
| S6 | 85 | 42 | 43 |

BRIEF SUMMARY

It was an object of the invention to provide an improved process for MEOR.

Accordingly, a process has been found for producing mineral oil from underground mineral oil deposits using microorganisms, in which at least one injection borehole and at least one production borehole have been sunk into the deposit, the deposit temperatures ($T_L$) are in the range from 45° C. to 120° C. and mineral oil is produced from the deposit, by injecting aqueous flooding media into the at least one injection borehole and producing mineral oil through the at least one production borehole, wherein the process comprises at least m process cycles $Z_1$ to $Z_m$, in which each of the process cycles $Z_1$ to $Z_m$ comprises the process steps of
(I) mobilizing mineral oil in the formation by injecting at least one aqueous formulation of oil-mobilizing microorganisms, nutrients and optionally an oxygen source, said microorganisms having an optimal growth temperature $T_W$, and
(II) injecting flooding water with a temperature of <45° C., the number of cycles is m≥2, process steps (I) and (II) are each performed in repeated alternating succession per cycle $Z_1$ to $Z_m$, and $T_W$ of the injected microorganisms is not altered during the performance of each of cycles $Z_1$ to $Z_m$, and in which the microorganisms used in each of process cycles $Z_1$ to $Z_m$ have a different optimal growth temperature $T_W$, in the execution of the first process cycle $Z_1$, microorganisms with the highest $T_W$ are injected, and in each new execution of process cycle Z, microorganisms which have a lower optimal growth temperature $T_W$ than the microorganisms injected in the preceding process cycle Z are injected.

DETAILED DESCRIPTION OF THE PREFERRED EMBODIMENTS

Figure 1:
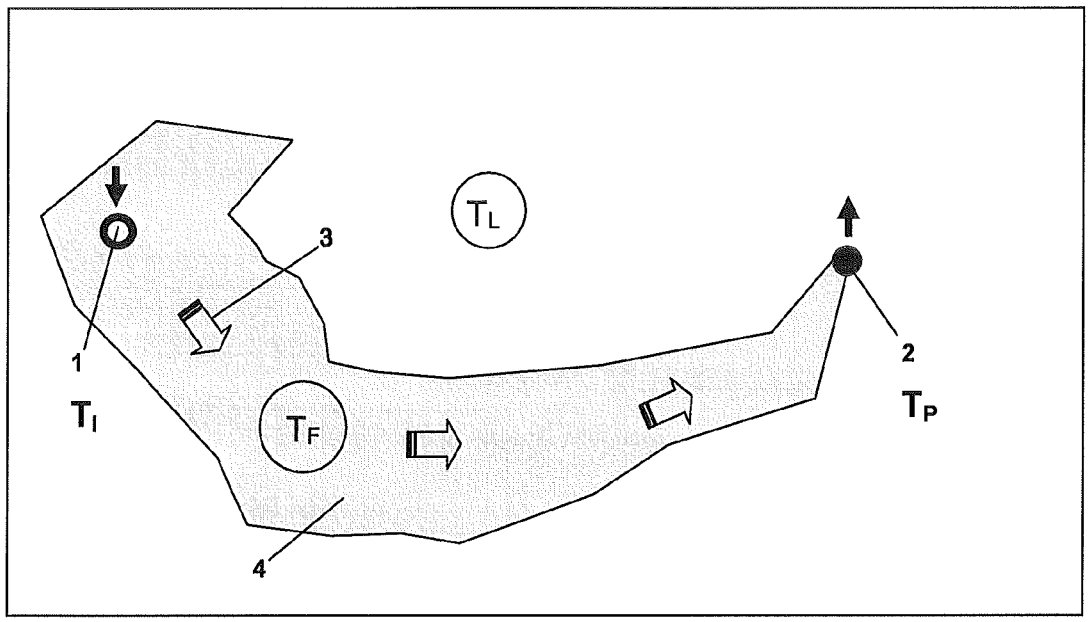
FIG. 1 Schematic diagram of water flooding in the course of process step (II).

With regard to the invention, the following can be stated specifically:

The process according to the invention is employed once primary mineral oil production has stopped due to the autogenous pressure of the deposit, and the pressure in the deposit is maintained by injection of liquid flooding media. It is suitable especially for those deposits in which water flooding does not lead to a satisfactory result because the oil yield is too low. This may be the case, for example, in deposits which have low permeability and/or the oil is not very mobile, such that it can be forced out only with difficulty, if at all, by the flooding water. However, the process is not limited to application in such deposits.

Deposits

The mineral oil deposits may be deposits for all kinds of oil, for example those for light or for heavy oil, with the proviso that the deposit temperatures ($T_L$) are in the range from 45° C. to 120° C., preferably 50° C. to 100° C., more preferably 50° C. to 80° C. The deposit temperature means the naturally existing temperature in the deposit. It can be altered by the process steps described hereinafter.

Process

To execute the process, at least one production borehole and at least one injection borehole are sunk into the mineral oil deposit. In general, a deposit is provided with several injection boreholes and optionally with several production boreholes. Aqueous flooding media can be injected into the mineral oil deposit through the injection boreholes, and mineral oil is withdrawn from the deposit through the production boreholes. The aqueous flooding media used in each of the individual process steps are described hereinafter. According to the invention, the aqueous flooding media are injected in the process steps described hereinafter always using the same injection boreholes; thus, no new injection boreholes are drilled. What is important hereinafter is not whether the terms "injection borehole" or "production borehole" are used hereinafter in the singular or plural, but what is meant in each case is "at least one injection borehole" or "at least one production borehole".

The term "mineral oil" here of course does not mean single-phase mineral oil, but what is meant is the customary emulsions which comprise oil and formation water and are produced from mineral oil deposits. The oil phase and the water phase are separated from one another after production in a manner known in principle.

Process Cycles Z

The process according to the invention comprises m process cycles $Z_1$ to $Z_m$, where m≥2. In other words, the process comprises at least two process cycles Z.

Each of process cycles $Z_1$ to $Z_m$ comprises at least two process steps (I) and (II), each of which is performed repeatedly in alternating succession. In process step (I), suitable microorganisms which are capable of mobilizing mineral oil in the formation are injected into the formation. In process step (II), mineral oil is produced by water flooding.

According to the invention, steps (I) and (II) are performed repeatedly in alternating succession, i.e. at least twice. Each of cycles $Z_1$ to $Z_m$ thus comprises at least steps (I)-(II)-(I)-(II).

Process Step (I)

In process step (I), the mineral oil formation is treated with suitable microorganisms for mobilization of mineral oil, by injecting suitable microorganisms into the deposit. The microorganisms are especially bacteria.

For preparation for process step (I), geophysical and biochemical studies of the mineral oil formation should appropriately first be carried out. For is the deposit temperature and optionally the temperature distribution of the mineral oil formation determined, at least in the region between injection borehole and production borehole. Methods of determining the temperature distribution of a mineral oil deposit are known in principle to those skilled in the art. It will generally be undertaken from temperature measurements at particular sites in the formation in combination with simulation calculations, the simulation calculations taking account of factors including amounts of heat introduced into the formation and the amounts of heat removed from the formation. By means of biochemical analyses, it is possible to detect the presence and amount of aerobic and anaerobic microorganisms in the region of the injection borehole and of the production borehole close to the base of the borehole. For this purpose, samples are taken from the formation.

The microorganisms injected in the course of process step (I) may be aerobic or anaerobic, preferably anaerobic, microorganisms. In addition, nutrients and optionally an oxygen source, preferably an oxygenous gas, are injected into the mineral oil formation. To this end, the components are formulated in an aqueous medium in a suitable manner. The three components, microorganisms, nutrient solution and optionally an oxygen-comprising gas, can be injected together, or else successively in individual portions, such that microorganisms, nutrient solution and optionally the oxygen source do not mix with one another until within the formation. An oxygenous gas can be injected as such, or it is possible with preference to inject an oxygenous flooding medium, especially oxygenous water or brine. The concentration of dissolved oxygen in the aqueous flooding medium, especially water, may, for example, be 0.05 to 0.5 $m^3$ of oxygen/$m^3$ of flooding medium. An oxygen source, preferably an oxygenous gas, is injected in the case of use of aerobic microorganisms, and is omitted in the case of use of anaerobic microorganisms.

Suitable microorganisms for mobilizing mineral oil in a mineral oil formation are known in principle to the person skilled in the art, for example from the literature cited at the outset. Mineral oil can be mobilized on the basis of one or more of the following mechanisms: formation of surfactants, reduction in the viscosity of the mineral oil resulting from degradation of high molecular weight hydrocarbons, formation of $CO_2$ and/or methane, formation of organic acids which can attack the rock formation and hence create new flow paths, or resulting from the detachment of the mineral oil from the rock surface.

Examples of suitable microorganisms are mentioned, for example, in "*The Phylogenetic Diversity of Aerobic Organotrophic Bacteria from the Dagang High-Temperature Oil Field*" T. N. Nazina, D. Sh. Sokolova, N. M. Shestakova, A. A. Grigoryan, E. M. Mikhailova, T. L. Babich, A. M. Lysenko, T. P. Tourova, A. B. Poltaraus, Qingxian Feng, Fangtian Ni, and S. S. Belyaev *Microbiology*, Vol. 74, No. 3, 2005, pp. 343-351. Translated from *Mikrobiologiya*, Vol. 74, No. 3, 2005, pp. 401-409 or "*Use of Microorganisms in the Biotechnology for the Enhancement of Oil Recovery*. S. S. Belyaev, I. A. Borzenkov, T. N. Nazina, E. P. Rozanova, I. F. Glumov, R. R. Ibatullin, and M. V. Ivanov, *Microbiology*, Vol. 73, No. 5, 2004, pp. 590-598".

Examples of suitable microorganisms comprise anaerobic representatives of various genera, for example *Clostridium* sp., *Bacillus* sp., *Desulfovibrio* sp., *Arthrobacter* sp., *Mycobacterium* sp., *Micrococcus* sp., *Brevibacillus* sp., *Actinomyces* sp. or *Pseudomonas* sp.

Suitable nutrient solutions for microorganisms are known in principle to the person skilled in the art. They comprise, for example, phosphate or ammonium salts. They may comprise, as main components, for example, $NaNO_3$, $KNO_3$, $NH_4NO_3$, $Na_2HPO_4$, $NH_4Cl$, trace elements, for example B, Zn, Cu, Co, Mg, Mn, Fe, Mo, W, Ni, Se, vitamins such as folic acid, ascorbic acid, riboflavin, electron acceptors such as $SO_4^{2-}$, $NO_3^-$, $Fe^{3+}$, humic acids, mineral oxides, quinone compounds or combinations thereof.

The maximum growth rate of microorganisms depends on the temperature. The temperature at which the growth of the microorganisms is at its greatest shall be referred to hereinafter as $T_W$. In this context, the person skilled in the art distinguishes between different classes of microorganisms, namely psychrophilic, mesophilic, thermophilic and hyperthermophilic bacteria, and the temperature ranges of maximum growth rate may be defined slightly differently according to the literature reference. Table 3 below shows a typical classification on which the present invention shall be based.

TABLE 2

Minimum, maximum and optimal growth temperature for different classes of microorganisms.

| | Minimum temperature | Optimum | Maximum temperature |
|---|---|---|---|
| Psychrophiles | −5° C. | 12 to 15° C. | 25° C. |
| Mesophiles | 15° C. | 30 to 40° C. | 47° C. |
| Thermophiles | 40° C. | 55 to 75° C. | 90° C. |
| Hyperthermophiles | 70° C. | 80 to 90° C. | 110° C. |

In table 3 below, some microorganisms are compiled, with the optimal growth temperature for each:

TABLE 3

Optimal growth temperature of different microorganisms

| Psychrophiles | Mesophiles | Thermophiles | Hyperthermophiles |
|---|---|---|---|
| *Flavobacterium antarcticum* 15° C. | *Escherichia coli* 37° C. | *Streptococcus thermophilus* 45° C. | *Aquifex pyrophilus* 85° C. |
| *Photobacterium profundum* 10° C. | *Streptomyces coelicolor* 28° C. | *Geobacillus stearothermophilus* 55° C. | *Pyrodictium brockii* 85-105° C. |
| *Shewanella benthica* 4° C. | *Bacillus subtilis* 30° C. | *Thermus aquaticus* 70° C. | *Pyrobaculum islandicum* 95-100° C. |
| *Chlamydomonas nivalis* | *Corynebacterium glutamicum* 30° C. | *Streptomyces thermogriseus* 55-60° C. | *Methanopyrus kandleri* 98° C. |
| *Flavobacterium frigidarium* 15° C. | *Pseudomonas putida* 26° C. | *Clostridium stercorarium* 60° C. | *Ignisphaera aggregans* 92° C. |
| *Leptothrix mobilis* 25° C. | *Salmonella enterica* 30-37° C. | *Thermovorax subterraneus* 70° C. | *Archaeoglobus veneficus* 75° C. |
| *Bacillus marinus* 20° C. | *Micrococcus luteus* 30° C. | *Geothermobacter ehrlichii* 50-55° C. | *Geoglobus acetivorans* 80° C. |

Process Step (II)

After the mobilization of mineral oil in the formation by means of process step (I), mineral oil is produced by injection of flooding water into the injection borehole and withdrawal of mineral oil through the production borehole. The oil mobilized by the microorganisms is thus produced by further water flooding.

The flooding water used may be all kinds of water, for example fresh water, salt water or brine, and the water may optionally also comprise further additives. The flooding water used for injection has a temperature of less than 45° C., generally less than 25° C. and, for example, less than 20° C. It may, for example, be seawater. The duration of the water flooding is guided by the conditions in the formation; it may quite possibly last for months or even years.

Combination of Steps (I) and (II)

According to the invention, steps (I) and (II) are performed n times in succession per cycle, where n≥2 and the number n may assume different values for each cycle. In general, n is from 2 to 5, preferably 2 or 3. The sequence of process steps may thus preferably be (I)-(II)-(I)-(II) or (I)-(II)-(I)-(II)-(I)-(II). Each cycle thus comprises at least two MEOR process steps, each followed by water flooding. The optimal growth temperature $T_W$ of the microorganisms used in the process steps (I) executed during one cycle is not altered within a cycle, which means that the same microorganisms are used in each case during one cycle.

After the mobilization of mineral oil in process step (I), the production is continued by injecting flooding water (process step (II)).

In the course of process step (II), the flooding water forces the mobilized mineral oil in the direction of the production borehole, through which it can be withdrawn. In this case, a flow zone forms between the production borehole and the injection borehole. This is shown schematically in FIG. 1. Water is injected into the injection borehole (1), flows from there in the direction of the production borehole (2), and in the process forces mineral oil out of the pores in the direction of the production borehole. The flow direction is indicated by the arrow (3). Within the (gray-shaded) zone (4), mineral oil is at least partly displaced by the water front. The direction of the water front (3) and the size and position of the zone (4) are determined by the circumstances in the deposit, for example the three-dimensional dynamics of the permeability characteristic, fissuring or local geological faults. The zone (4) may have a complicated branched form, especially when several injection boreholes for water and several production boreholes are present in this section.

In the flow zone (4), the flooding water generally does not force the mineral oil onward in a homogeneous manner. The reason for this is that the permeability is generally not homogeneous in the flow zone either. When more porous regions are present, for example fine cracks, fractures or fissures, the water flows preferentially through these zones of relatively low flow resistance. Moreover, the oil under some circumstances is removed only partially from pores. For example, an oil droplet which is not entrained by the water flowing through these pores can remain in a pore. With increasing duration of water flooding, preferential flow paths for the water form can form to an ever greater degree. As a result of this, ever more water reaches the production borehole and, correspondingly, the proportion of water in the oil-water mixture produced increases with increasing duration of water flooding. This effect is known to the person skilled in the art as "watering out of production". Watering out of production is therefore a sign that the aqueous flooding medium is no longer flowing homogeneously through the formation from the injection borehole to the production borehole, but has found preferred flow paths through zones of greater than average permeability in the formation. The flooding water flowing through preferred flow paths no longer mobilizes any oil, or at least mobilizes it only insufficiently. Considerable amounts of oil can still remain in the flow zone (4). Moreover, further mineral oil still remains in the mineral oil formation outside the zone (4).

Further mineral oil is therefore obtained by again performing process step (I), followed by again performing process step (II).

Combination of Process Cycles $Z_1$ to $Z_m$

The process according to the invention comprises m process cycles $Z_1$ to $Z_m$. At least two of the process cycles are executed, i.e. m≥2. In general, m is from 2 to 5, preferably 2 or 3.

According to the invention, the microorganisms injected in each process cycle $Z_1$ to $Z_m$ have a different optimal growth temperature $T_W$. Thus, different microorganisms are used in each cycle $Z_1$ to $Z_m$, while the same microorganisms are used within each cycle.

In this context, in the execution of the first process cycle $Z_1$, microorganisms with the highest optimal growth temperature $T_W$ are injected. In each new performance of a process cycle, microorganisms are injected which have a lower optimal growth temperature $T_w$ than the microorganisms which were injected in the process cycle executed beforehand.

The optimal growth temperature $T_W$ of the first injected portion of microorganisms is appropriately such that it corresponds approximately to the natural deposit temperature $T_L$, which is between 45° C. and 120° C. When $T_W$ and $T_L$ are approximately the same, the microorganisms grow the most rapidly in the formation, and hence mineral oil is also mobilized efficiently in the formation. In the execution of a first cycle $Z_1$, it is thus possible to use, according to $T_L$, thermophilic and/or hyperthermophilic microorganisms in particular.

At a preferred deposit temperature $T_L$ in the range from 50° C. to 80° C., it is generally customary to commence with thermophilic bacteria, for example a strain selected from the group of Streptococcus thermophilus, Geobacillus stearothermophilus, Thermus aquaticus, Streptomyces thermogriseus, Clostridium stercorarium, Thermovorax subterraneus or Geothermobacter ehrlichii.

In the alternating execution of process steps (I) and (II) outlined above, it should be noted that the flooding water used for injection—as already described above—is comparatively cold and has a temperature of less than 45° C., generally less than 25° C. and, for example, less than 20° C. The injection of flooding water thus alters the temperature distribution in the mineral oil formation with increasing duration of flooding.

As a consequence of the advanced injection of cold flooding water, the temperature of the deposit at the site of the injection borehole falls at first compared to the original deposit temperature $T_L$. The flow of the flooding water in the direction of the production borehole (i.e. of zone (4)) can also cool further regions of the flow zone. Of course, the cooling effect is at its greatest at the injection borehole and decreases with increasing distance from the production borehole. In the flow zone (4) between the injection borehole (1) and the production borehole (2), a temperature gradient thus forms, with the temperature tending to rise in the direction of the production borehole, though the temperature within the flow zone—according to the flow conditions—need not necessarily rise uniformly. The average temperature within the flood zone (referred to hereinafter as $T_F$) is thus lower than the deposit temperature $T_L$. In the case of an original deposit temperature of 50 to 90° C., the temperature of the flooded zone can quite possibly fall to 25 to 45° C. over the course of time.

In the outlined sequence of process steps (I) and (II) within a cycle—as outlined above—the same microorganisms are used in each case, i.e. $T_w$ of the microorganisms is unchanged, where $T_W$ in the first cycle $Z_1$ should be very well matched to the temperature of the deposit, in order to achieve rapid growth of the microorganisms and hence good mobilization of the mineral oil.

As the temperature $T_F$ within the flood zone falls, it goes ever further below the optimal growth temperature $T_W$ of the microorganisms used during the first cycle. Accordingly, the growth of the microorganisms is also slowed to an ever greater degree, and in the extreme case finally stops completely. In that case, no mobilization of mineral oil is possible any longer.

According to the invention, therefore, for the repetition of the first cycle $Z_1$, i.e. for the cycle $Z_2$, microorganisms with a lower optimal growth temperature $T_W$ than in the first cycle are used, in order to take account of this cooling of the mineral oil formation in the flooded region. $T_w$ should therefore be selected such that it corresponds approximately to $T_F$. In the first repetition of the cycle $Z$, it is possible, for example, to inject mesophilic microorganisms.

If, as described above, the commencement temperature was a deposit temperature $T_L$ in the range from 50 to 80° C., the process can be continued after the temperature has been lowered to 30° C. to 40° C., for example, with mesophilic bacteria selected from the group of Escherichia coli; Streptomyces coelicolor, Bacillus subtilis, Corynebacterium glutamicum, Pseudomonas putida, Salmonella enterica or Micrococcus luteus.

After the temperature $T_F$ falls further due to continued injection of water, it is once again possible to start a new process cycle $Z_3$, in which microorganisms with a further-reduced $T_W$ are used. In the renewed repetition of cycle $Z$, it is possible, for example, to use psychrophilic microorganisms.

If, as described above, the commencement temperature was a deposit temperature $T_L$ in the range from 50 to 80° C., it is possible to continue the process after the temperature has been lowered to below 25° C., for example, with psychrophilic bacteria selected from the group of Flavobacterium antarcticum, Photobacterium profundum, Shewanella benthica, Chlamydomonas nivalis, Flavobacterium frigidarium, Leptothrix mobilis or Bacillus marinus.

The cycles can in principle be executed with m repetitions, where $T_W$ is reduced each time compared to $T_W$ of the preceding cycle. Preference is given to performing the process cycles Z twice or three times in succession, more preferably twice.

As a result of the m executions of the cycles Z, the formation is treated, according to the falling temperature of the flood zone $T_F$, in each case with microorganisms of matched $T_W$, and hence particularly good deoiling is achieved.

Optional Process Step (III)

In a further embodiment the process optionally comprises an additional process step (III).

In process step (III), highly permeable regions of the formation may be blocked. The highly permeable regions are essentially the flow zone in the region between the at least one injection borehole and the at least one production borehole, i.e. the zone which was only formed as a result of the performance of process cycles Z.

Techniques for blocking highly permeable regions of mineral oil formations are known in principle to those skilled in the art, for example from the literature cited at the outset. These involve injecting suitable aqueous formulations into the formation through the injection borehole, which can bring about closure of the highly permeable regions.

Figure 2:
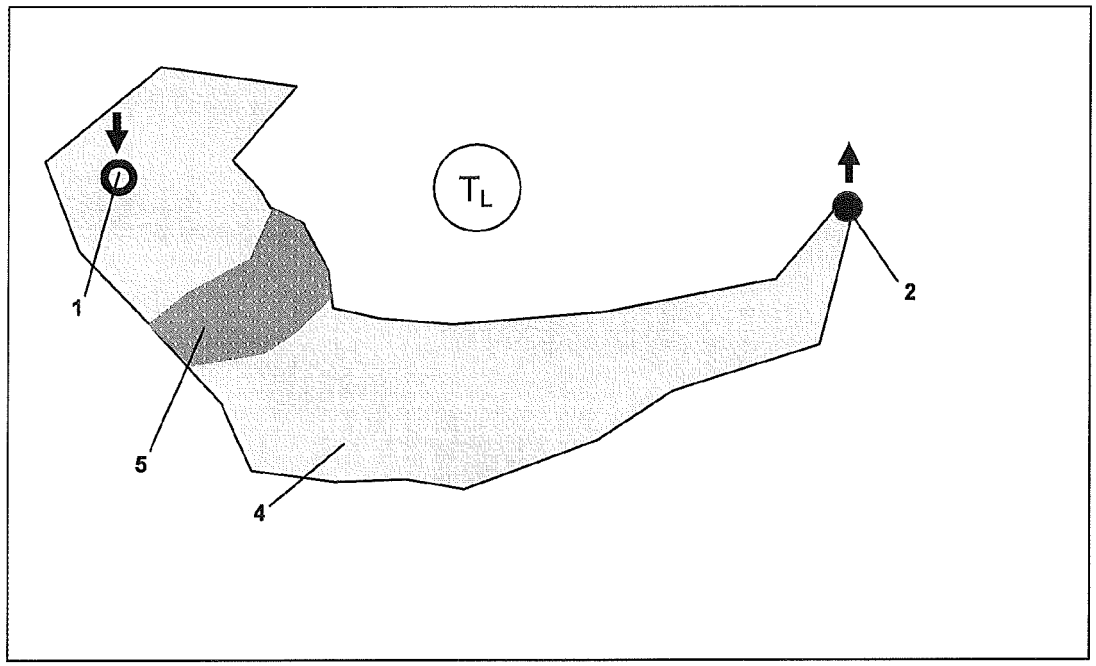
FIG. 2 Schematic diagram of the closure of the first flood zone by gels.

Highly permeable regions of the formation are preferably blocked by injecting at least one aqueous, gel-forming formulation (F) through the injection borehole, said formulations forming high-viscosity gels after injection into the deposit under the influence of the deposit temperature. After being injected into the formation, the formulations (F) naturally flow essentially through the highly permeable regions and close them after the gel has formed. This is shown schematically in FIG. 2. A gel plug (5) closes the highly permeable regions between the injection borehole and the production borehole.

The aqueous, gel-forming formulations (F) comprise, as well as water, one or more different water-soluble or water-dispersible chemical components which are responsible for gel formation. These are preferably at least two different components. They may be either inorganic components or organic components, and of course also combinations of inorganic and organic components.

For example, they may be formulations based on water-soluble polymers, as disclosed, for example, by U.S. Pat. Nos. 4,844,168, 6,838,417 B2 or US 2008/0035344 A1, or formulations based essentially on inorganic components, as disclosed, for example, by SU 1 654 554 A1, U.S. Pat. No. 4,889,563, RU 2 066 743 C1, WO 2007/135617, U.S. Pat. No. 7,273,101 B2 or RU 2 339 803 C2. Suitable formulations are also commercially available.

The temperature from which gel formation sets in (referred to hereinafter as $T_{gel}$) and the time after which this occurs (referred to hereinafter as $t_{gel}$) can be influenced, for example, by the type and concentration of the components. They can be adjusted such that gels are formed between 20° C. and 120° C., preferably 30 and 120° C. and more preferably 40 and 120° C. The citations cited comprise figures for this. The formulations can thus be adjusted such that the formulations form gels at the desired site in the highly permeable regions and block the highly permeable regions.

In a preferred embodiment, the formulation (F) is an acidic aqueous formulation, preferably having a pH of ≤5, and at least comprising water, a metal compound which is dissolved therein and can form gels when admixed with bases, and a water-soluble activator which brings about an increase in the pH of the aqueous solution above a temperature $T \geq T_{gel}$.

In addition to water, the formulation may optionally comprise further water-miscible organic solvents. Examples of such solvents comprise alcohols. In general, the formulations (F) should, however, comprise at least 80% by weight of water based on the sum of all solvents in the formulation, preferably at least 90% by weight and more preferably at least 95% by weight. Most preferably, only water should be present.

The dissolved metal compound preferably comprises aluminum compounds, especially dissolved aluminum(III) salts, for example aluminum(III) chloride, aluminum(III) nitrate, aluminum(III) sulfate, aluminum(III) acetate or aluminum(III) acetylacetonate. However, the dissolved metal compound may also be already partially hydrolyzed aluminum(III) salts, for example aluminum(III) hydroxychloride. It will be appreciated that it is also possible to use mixtures of several different aluminum compounds. The pH of the formulation is generally ≤5, preferably ≤4.5. The compound is preferably aluminum(III) chloride, aluminum(III) nitrate or aluminum(III) sulfate, most preferably aluminum(III) chloride.

Useful water-soluble activators include all compounds which, when heated to a temperature $T>T_{gel}$ in an aqueous medium, release bases or bind acids and hence ensure an increase in the pH of the solution. The increase in the pH forms high-viscosity, water-insoluble gels which comprise metal ions, hydroxide ions and optionally further components. In the case of use of aluminum compounds, an aluminum hydroxide or oxide hydrate gel may form, into which further components, for example the anions of the aluminum salt used, may of course also comprise. The water-soluble activators used may, for example, be urea, substituted ureas such as N,N'-alkylureas, especially N,N'-dimethylurea, hexamethylenetetramine (urotropin) or cyanates, especially urea, substituted ureas or hexamethylenetetramine. Urea, for example, is hydrolyzed in an aqueous medium to ammonia and $CO_2$. It will be appreciated that it is also possible to use mixtures of several different activators. The compound is preferably urea and/or hexa-methylenetetramine.

The formulations may additionally comprise further components which can accelerate or slow gel formation. Examples comprise further salts or naphthenic acids.

The concentrations of the metal compounds used are selected by the person skilled in the art such that a gel forms with the desired viscosity. The activator will therefore be used in such a concentration that a sufficient amount of base can form to lower the pH to such an extent that a gel can actually precipitate out. In addition, the amounts and the ratios can also be used to determine the gel formation time $t_{gel}$. The higher the concentration of the activator—at a given concentration of the metal compound—the higher the rate of gel formation. This relationship can be utilized by the person skilled in the art to deliberately accelerate or to slow the gel formation time $T_{gel}$. The rate of gel formation after exceedance of $T_{gel}$ is naturally also determined by the temperature which exists in the formation. In the case of aluminum, an amount of 0.2 to 3% by weight of aluminum(III), based on the aqueous formulation, has been found to be useful. The amount of the activator should at least be such that 3 mol of base are released per mol of Al(III).

Table 4 below shows, by way of example, the time until gel formation for a mixture of 8% by weight of $AlCl_3$ (calculated as anhydrous product, corresponds to 1.6% by weight of Al(III)), 25% by weight of urea and 67% by weight of water.

TABLE 4

Time until gel formation at different temperatures

| | Temperature [° C.] | | | | |
|---|---|---|---|---|---|
| | 100 | 90 | 80 | 70 | 60 |
| Gel formation time [days] | ¼ | 1 | 3 | 6 | 30 |

Table 5 below shows the time until gel formation for different mixtures of $AlCl_3$ (calculated as anhydrous product), urea and water at 100° C. or 100° C.

TABLE 5

Time until gel formation ("—" no measurement)

| Amounts used | | Weight ratio of $AlCl_3$/urea | Time until gel formation [h] | |
|---|---|---|---|---|
| | [% by wt.] | | 100° C. | 110° C. |
| $AlCl_3$ | 4 | 1:4 | 4.0 | — |
| Urea | 16 | | | |
| $AlCl_3$ | 4 | 1:3 | 4.3 | — |
| urea | 12 | | | |
| $AlCl_3$ | 4 | 1:2 | 7.3 | — |
| urea | 8 | | | |
| $AlCl_3$ | 4 | 1:1 | 19.0 | — |
| urea | 4 | | | |
| $AlCl_3$ | 8 | 1:3.75 | 5.3 | 2 |
| urea | 30 | | | |
| $AlCl_3$ | 2 | 1:3.75 | — | 8 |
| urea | 7.5 | | | |
| $AlCl_3$ | 8 | 1:3 | 5.5 | — |
| urea | 24 | | | |

TABLE 5-continued

Time until gel formation ("—" no measurement)

| Amounts used | | Weight ratio of $AlCl_3$/urea | Time until gel formation [h] | |
|---|---|---|---|---|
| | [% by wt.] | | 100° C. | 110° C. |
| $AlCl_3$ | 8 | 1:2 | 8.3 | — |
| urea | 16 | | | |
| $AlCl_3$ | 8 | 1:1 | 18.0 | — |
| urea | 8 | | | |
| $AlCl_3$ | 8 | 1:0.75 | 23.0 | — |
| urea | 6 | | | |

It can be seen that, with decreasing amount of the urea activator, the time to formation of the gel becomes ever longer both for the series with 8% by weight of $AlCl_3$ and the series with 4% by weight of $AlCl_3$ with decreasing amount of urea. The gel formation time can thus be altered in a controlled manner via the aluminum salt/urea ratio.

Gel-forming formulations which are particularly suitable for low deposit temperatures can be obtained by replacing all or some of the urea as an activator with urotropin (hexamethylenetetramine) as an activator. Urotropin likewise releases ammonia under deposit conditions. Such gel-forming formulations also lead to gel formation at temperatures below 50° C. Typical aqueous formulations may comprise 4 to 16% by weight of urea, 2 to 8% by weight of urotropin and 2 to 4% by weight of aluminum chloride or nitrate (calculated as anhydrous salt) and water or salt water. Such formulations are disclosed, for example, by RU 2 066 743 C1. Table 6 below compares some formulations disclosed in RU 2 066 743 C1, pages 5 to 7, and the gel formation thereof at different temperatures.

TABLE 6

Gel formation as a function of temperature and time

| No. | Components | % wt. | Viscosity η before heat treatment [MPa · s] | Temperature | | | | | | | |
|---|---|---|---|---|---|---|---|---|---|---|---|
| | | | | 20° C. | | 50° C. | | 70° C. | | 90° C. | |
| | | | | Gel formation time $t_{gel}$ [days] | η [MPa · s] | $t_{gel}$ [days] | η [MPa · s] | $t_{gel}$ [days] | η [MPa · s] | $t_{gel}$ [days] | η [MPa · s] |
| 1 | Urea | 16.0 | 2.4 | 100 | No gel formation | 27 | No gel formation | 4 | 3240 | | |
| | $AlCl_3$ | 4.0 | | | | | | | | | |
| 2 | Urea | 16.0 | | | | | | | | | |
| | $AlCl_3$ | 4.0 | | | | | | | | | |
| | Urotropin | 8.0 | 2.4 | 3 | 6960 | 1 | 4980 | 0.5 | 2500.0 | 0.5 | 2700 |
| 4 | Urea | 16.0 | | | | | | | | | |
| | $AlCl_3$ | 4.0 | | | | | | | | | |
| | Urotropin | 6.0 | 1.5 | 2 | 1830 | 3 | 4100 | 1 | 2100.0 | 1 | 2800.0 |
| 8 | Urea | 16 | | | | | | | | | |
| | $AlCl_3$ | 2.0 | | | | | | | | | |
| | Urotropin | 8.0 | 2.0 | 7 | 374.0 | 3 | 3870 | 1 | 2100.0 | 0.5 | 1200.0 |
| 9 | Urea | 16 | | | | | | | | | |
| | $AlCl_3$ | 4.0 | | | | | | | | | |
| | Urotropin | 4.0 | 1.5 | 7 | 1300.0 | 2 | 3500 | | | | |
| 5 | Urea | 8.0 | | | | | | | | | |
| | $AlCl3$ | 4.0 | | | | | | | | | |
| | Urotropin | 8.0 | 1.6 | 2 | 3210 | 2 | 6100 | 1 | 2870.0 | 0.5 | 2900.0 |
| 7 | Urea | 8.0 | | | | | | | | | |
| | $AlCl_3$ | 2.0 | | | | | | | | | |
| | Urotropin | 4.0 | 1.6 | 4 | 600.0 | 4 | 6050 | 1 | 2200.0 | 1 | 2300.0 |
| 6 | Urea | 6.0 | | | | | | | | | |
| | $AlCl_3$ | 4.0 | | | | | | | | | |
| | Urotropin | 8.0 | 1.5 | 2 | 1830 | 2 | 4100 | 1 | 2500.0 | 1 | 5800.0 |
| 3 | Urea | 4.0 | | | | | | | | | |
| | $AlCl_3$ | 4.0 | | | | | | | | | |
| | Urotropin | 8.0 | 1.4 | 7 | 2960 | 2 | 3790 | 1 | 2310.0 | 1 | 2300.0 |

The described preferred formulations based on dissolved metal compounds, especially aluminum salts, and activators have the advantage that inorganic gels are formed. The gels are stable up to temperatures of 300° C. In addition, the inorganic gels can also be removed very easily from the formation again if required, by injecting acid into the formation and dissolving the gels.

Procedure After Performance of Process Step (III)

After the optional performance of process step (III), the oil production is continued, for example by water flooding.

Figure 3:
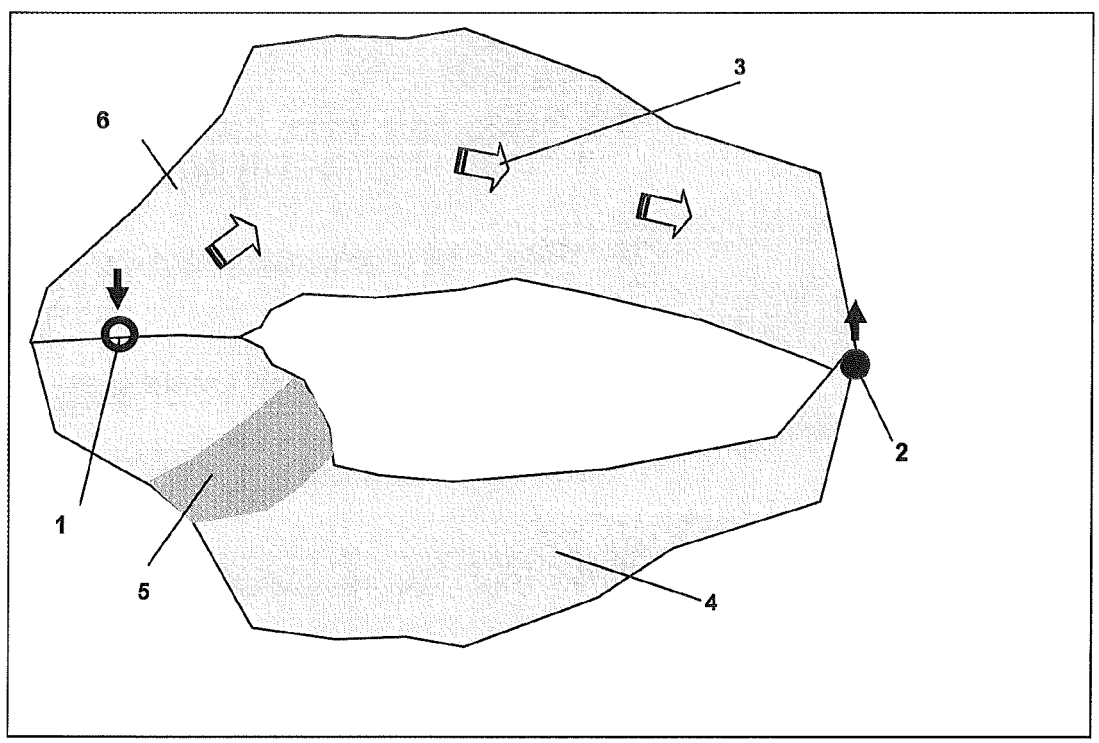
FIG. 3 Schematic diagram of the formation of a new flood zone after closure of the first flood zone.

The oil is preferably produced by repeated execution of process cycles Z. This is shown schematically in FIG. 3. A new flood zone (6) forms, from which mineral oil is now extracted.

In this context, it should be noted that, in the new execution of process cycles Z, the sequence of optimal growth temperatures $T_W$ also begins again from the start.

For the repetition, process cycles $Z_{1'}$ to $Z_{m'}$ are performed, where m'≥2, preferably 2 to 5 and more preferably 2 or 3.

The first performance of a cycle $Z_{1'}$ after process step (III) begins with the highest $T_W$, and then $T_W$ is reduced stepwise from cycle to cycle according to the falling temperature in the flood zone. In general, the new flood zone (6) initially has the deposit temperature or at least approximately the deposit temperature, and $T_W$ is fixed correspondingly.

It will be appreciated that further variants of the process according to the invention are possible. For example, process step (III) can be performed for a second time, and again a series of process cycles $Z_{1''}$ to $Z_{m''}$.

The invention claimed is:

1. A process for producing mineral oil from underground mineral oil deposits using microorganisms, in which at least one injection borehole and at least one production borehole have been sunk into the deposit, the deposit temperatures ($T_L$) are in the range from 45° C. to 120° C. and mineral oil is produced from the deposit, by injecting aqueous flooding media into the at least one injection borehole and producing mineral oil through the at least one production borehole, wherein the process comprises at least m process cycles $Z_1$ to $Z_m$, in which each of the process cycles $Z_1$ to $Z_m$ comprises the process steps of
(I) mobilizing mineral oil in the formation by injecting at least one aqueous formulation of oil-mobilizing microorganisms, nutrients and optionally an oxygen source, said microorganisms having an optimal growth temperature $T_W$, and
(II) injecting flooding water with a temperature of <45° C., the number of cycles is m≥2, process steps (I) and (II) are each performed in repeated alternating succession per cycle $Z_1$ to $Z_m$, and $T_W$ of the injected microorganisms is not altered during the performance of each of cycles $Z_1$ to $Z_m$, and in which the microorganisms used in each of process cycles $Z_1$ to $Z_m$ have a different optimal growth temperature $T_W$, in the execution of the first process cycle $Z_1$, microorganisms with the highest $T_W$ are injected, and in each new execution of process cycle Z, microorganisms which have a lower optimal growth temperature $T_W$, than the microorganisms injected in the preceding process cycle Z are injected.

2. The process according to claim 1, wherein the flooding water has a temperature of <25° C.

3. The process according to claim 1, wherein m=2.

4. The process according to claim 3, wherein thermophilic or hyperthermophilic microorganisms are used in the first process cycle $Z_1$, and mesophilic microorganisms in the second process cycle $Z_2$.

5. The process according to claim 1, wherein the oxygen source is an oxygenous gas.

6. The process according to claim 1, wherein performance of a first cycle $Z_1$ is followed by complete or partial blocking of highly permeable regions of the mineral oil formation by means of a further process step (III), and continuation of oil production after step (III), by injecting at least one aqueous, gel-forming formulation (F) into the formation, said formulations (F) comprising water and one or more water-soluble or water-dispersible components which form high-viscosity gels after injection into the deposit under the influence of the deposit temperature.

7. The process according to claim 6, wherein the aqueous, gel-forming formulation (F) is an acidic aqueous formulation at least comprising:
water,
aluminium(III) compounds which are dissolved therein and can form gels when admixed with bases, and
a water-soluble activator, which brings about an increase in the pH of the aqueous solution above a temperature $T_{gel}$, selected from the group of urea, substituted ureas, hexamethylenetetramine and cyanates.

8. The process according to claim 7, wherein the aluminum (III) compound is at least one selected from the group of aluminum(III) chloride, aluminum(III) nitrate, aluminum (III) sulfate, aluminum(III) acetate and aluminum(III) acetylacetonate.

9. The process according to claim 6, wherein oil production is continued after process step (III) by means of water flooding.

10. The process according to claim 6, wherein oil production is continued after process step (III), or water flooding which follows process step (III), by renewed execution of m' process cycles $Z_{1'}$ to $Z_{m'}$ where m' ≥2.

11. The process according to claim 10, wherein m'=2 and thermophilic or hyperthermophilic microorganisms are used in the first cycle $Z_{1'}$, and mesophilic microorganisms in the second cycle $Z_{2'}$.

* * * * *